United States Patent
Weisserth et al.

(10) Patent No.: US 12,495,031 B2
(45) Date of Patent: Dec. 9, 2025

(54) END TO END ARTIFACT TRUST IN CLOUD ENVIRONMENTS

(71) Applicant: MICROSOFT TECHNOLOGY LICENSING, LLC, Redmond, WA (US)

(72) Inventors: Tobias D.F. Weisserth, Redmond, WA (US); Qiming Chen, Seattle, WA (US); Sohail A. Hirani, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 147 days.

(21) Appl. No.: 18/372,035

(22) Filed: Sep. 22, 2023

(65) Prior Publication Data

US 2025/0016149 A1    Jan. 9, 2025

Related U.S. Application Data

(60) Provisional application No. 63/525,144, filed on Jul. 5, 2023.

(51) Int. Cl.
    *H04L 9/40* (2022.01)
(52) U.S. Cl.
    CPC .......... *H04L 63/0823* (2013.01); *H04L 63/20* (2013.01)
(58) Field of Classification Search
    CPC .......................... H04L 63/0823; H04L 63/20
    USPC ............................................................ 726/1
    See application file for complete search history.

(56) References Cited

U.S. PATENT DOCUMENTS

| | | | | |
|---|---|---|---|---|
| 10,057,243 | B1* | 8/2018 | Kumar | H04L 9/0891 |
| 2007/0245414 | A1* | 10/2007 | Chan | H04L 9/3234 |
| | | | | 726/12 |
| 2008/0098229 | A1* | 4/2008 | Hartrell | G06F 21/64 |
| | | | | 713/176 |
| 2021/0397712 | A1* | 12/2021 | Gajananan | G06F 21/53 |
| 2022/0019418 | A1* | 1/2022 | Mckay | H04L 67/34 |
| 2023/0353381 | A1* | 11/2023 | Bhamidipati | H04L 9/3213 |

FOREIGN PATENT DOCUMENTS

| | | |
|---|---|---|
| CN | 104376252 B | 3/2017 |
| CN | 105471918 B | 6/2018 |
| CN | 113138867 A | 7/2021 |

OTHER PUBLICATIONS

Jibilian, et al., "The US is Readying Sanctions Against Russia Over the SolarWinds Cyber Attack. Here's a Simple Explanation of How the Massive Hack Happened and Why it's Such a Big Deal", Retrieved From: https://www.businessinsider.com/solarwinds-hack-explained-government-agencies-cyber-security-2020-12, Apr. 15, 2021, 9 Pages.

(Continued)

*Primary Examiner* — Michael S McNally
(74) *Attorney, Agent, or Firm* — Han Gim; Newport IP, LLC

(57) ABSTRACT

Techniques are described for providing end-to-end content trust for artifact types managed by a service provider, regardless of where or how the artifacts are deployed or applied in a target environment. The described trust mechanism is agnostic to the specific type of artifact and where the artifact is being applied from within a cloud environment.

20 Claims, 15 Drawing Sheets

(56) References Cited

OTHER PUBLICATIONS

Lorenc, Dan, "Notary V2 and Cosign", Retrieved From: https://dlorenc.medium.com/notary-v2-and-cosign-b816658f044d, Nov. 8, 2021, 14 Pages.
Panato, et al., "Sigstore Cosign", Retrieved From: https://github.com/sigstore/cosign, Retrieved Date: May 26, 2023, 15 Pages.
Zha, et al., "Notary Project Specifications", Retrieved From: https://github.com/notaryproject/specifications, Aug. 4, 2023, 3 Pages.
International Search Report and Written Opinion received for PCT Application No. PCT/US2024/036345, mailed on Oct. 10, 2024, 14 pages.

\* cited by examiner

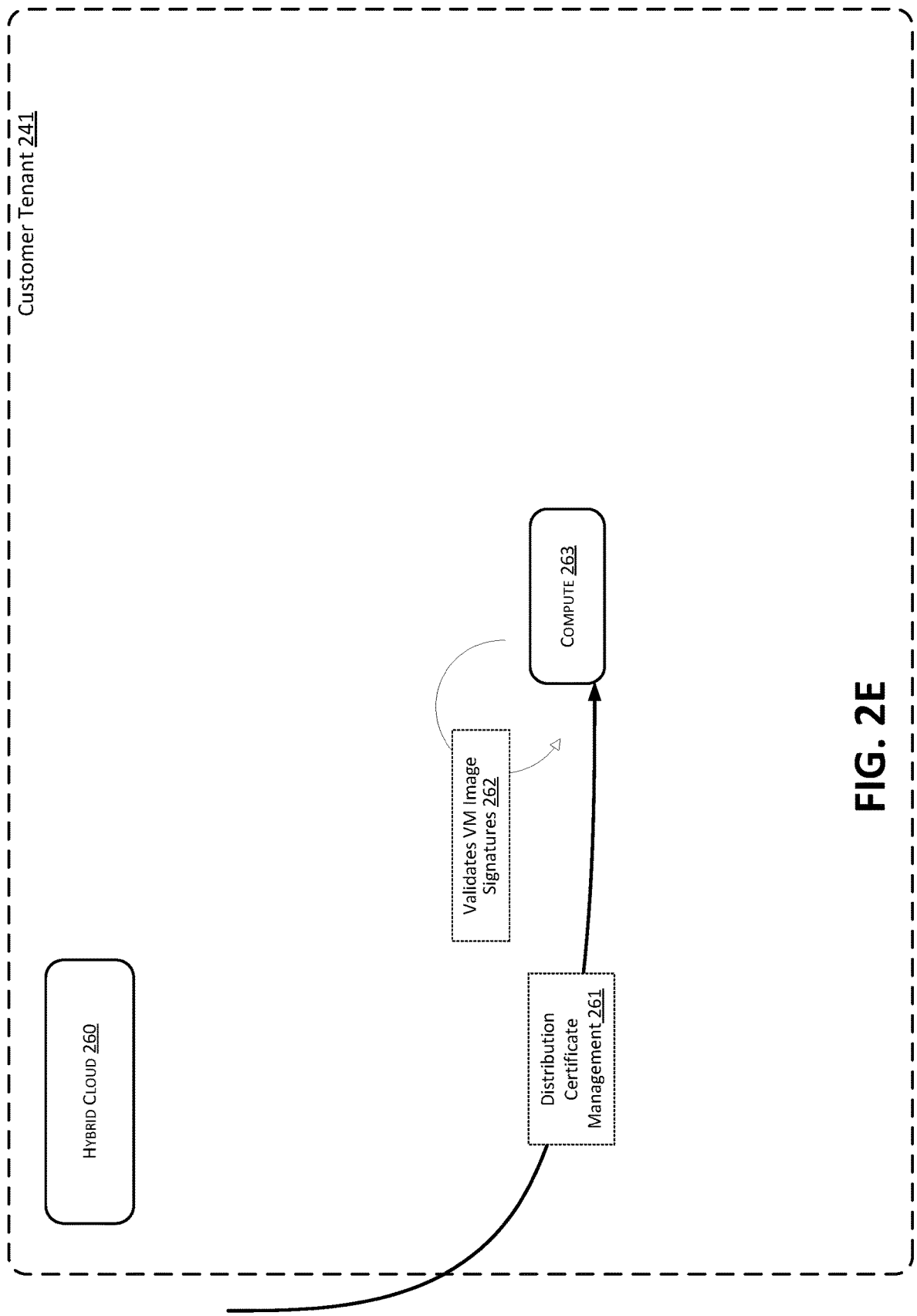

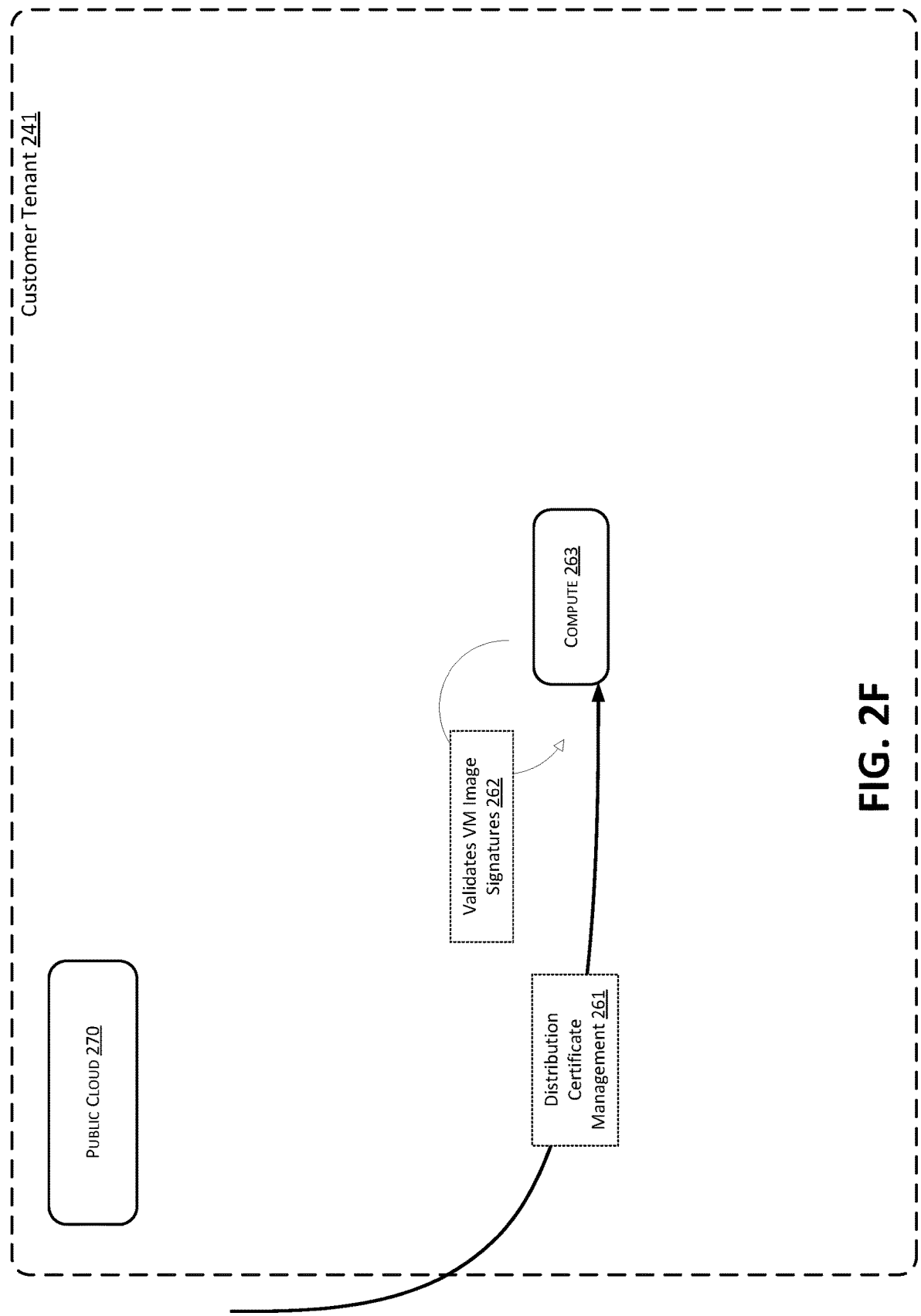

END TO END ARTIFACT TRUST IN CLOUD ENVIRONMENTS

PRIORITY APPLICATION

This application claims the benefit of and priority to U.S. Provisional Application No. 63/530,047, filed Jul. 31, 2023, the entire contents of which are incorporated herein by reference.

BACKGROUND

A data center may house computer systems and various networking, storage, and other related components. Data centers may, for example, be used by service providers to provide computing services to businesses and individuals as a remote computing service or provide "software as a service" (e.g., cloud computing). Service providers may also utilize edge sites that include a geographically distributed group of servers and other devices that work together to provide delivery of content to end-users of data center services. In some implementations, service providers enable infrastructure and workload orchestration in hybrid cloud environments. In such complex environments, numerous artifacts are created, used, and managed, such as virtual machine (VM) images, container images, workload and service configuration artifacts, and the like. These artifacts are persisted and distributed by the service provider, resulting in deployments and configurations applied by the service provider in customer target environments.

Software artifact content trust is an important aspect of software supply chain security in such environments. Software artifact content trust refers to the ability to verify the authenticity, integrity, and provenance of software artifacts, such as packages, libraries, or binaries, that are consumed by developers or end-users. Software artifact content trust enables users to have confidence that the artifacts they use are not tampered with, compromised, or malicious. An unsecure software supply chain may attract trojan horse attacks, for example. To enable a service provider to deliver trusted vendor applications into the operator environment, content trust is an important aspect of such services.

It is with respect to these considerations and others that the disclosure made herein is presented.

SUMMARY

Supply chain security is an important requirement for service orchestration and verifiable trust at the level of each individual artifact, regardless of its type and target environment. Supply chain security is needed to provide protection against increasingly sophisticated supply chain attacks. It is desirable for service providers to provide end-to-end artifact trust with the ability to trace back the origin of each artifact under management by the service provider. The service provider can enforce policies to prevent untrusted and unverified artifacts from being deployed or applied in user environments.

The present disclosure provides a way to address end-to-end content trust for artifact types managed by the service provider, regardless of where or how the artifacts are deployed or applied in a target environment. In an embodiment, a trust mechanism is described that is agnostic to the specific type of artifact and where the artifact is being applied from within a cloud environment.

In an embodiment, a resource type is provided to describe an artifact store which is used to hold all artifacts under management of the service provider. Access to the underlying artifacts is protected by protective measures or safety mechanisms to enforce artifact immutability and versioning at the platform level. The artifact store resource type is an abstraction from actual storage and the service provider manages underlying registry and storage mechanisms. In an embodiment, a trusted artifact store is provided that requires publishers managing artifacts in any type of artifact store to provide a valid signature for each artifact that the publisher declares and enters into the platform.

In various embodiments disclosed here, deployments of these artifacts are end-to-end verified for a valid signature. The initial signature provided at entry of an artifact is provided by publishers based on a signing key that the publisher obtains from a certificate authority that the service provider's platform recognizes as trustworthy. The publisher performs the certificate authority's verification process to obtain a valid signing certificate. The publisher signs their artifacts with the valid signing certificate and submits both artifacts and signatures into the trusted artifact store. The service provider verifies the signature and in response to verifying a valid signature, the service provider re-signs the artifact with a platform generated and managed certificate. Trust from that point on in the supply chain is based on this source of trust. The service provider manages the distribution and lifecycle of this certificate in target deployment environments where application of signed artifacts is verified for a valid signature.

The disclosed embodiments provide for secure deployment of all types of artifacts saved in an artifact store with end-to-end content trust. One technical benefit is the unified onboarding of trusted artifacts by third party publishers without the third-party publishers being required to have knowledge about how supply chain management is implemented on the cloud service provider's platform. The disclosed embodiments enable publisher identity validation to be offloaded to the certificate authority (CA). The disclosed embodiments further enable the reuse of the existing CA public key infrastructure (PKI) to distribute a trusted root certificate. Additionally, private key exchange is reduced which enhances key security. The described techniques can allow for secure delivery of services by a cloud and edge computing network, maintaining security of data and data access, and prevention of data loss, while maintaining efficient use of computing resources such as processor cycles, memory, network bandwidth, and power during operation of the edge computing network during the described conditions.

This Summary is provided to introduce a selection of concepts in a simplified form that are further described below in the Detailed Description. This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 2E is a diagram illustrating an example architecture in accordance with the present disclosure;

FIG. 2F is a diagram illustrating an example architecture in accordance with the present disclosure;

DETAILED DESCRIPTION

Figure 1:
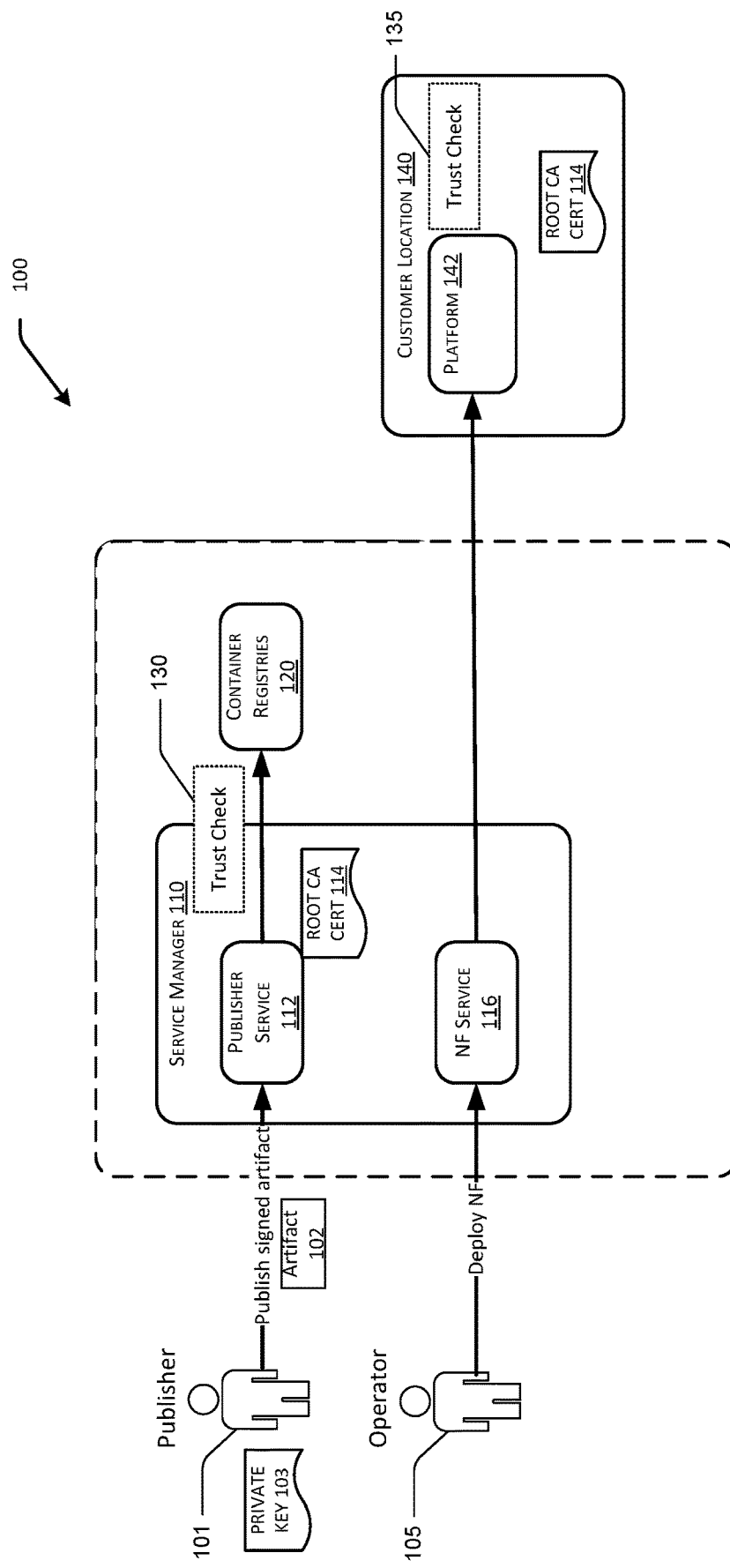
FIG. 1 is a diagram illustrating an example architecture in accordance with the present disclosure.

The problem space of end-to-end content trust in binary packaging, distribution, and orchestration platforms in hybrid cloud environments is highly fragmented and not standardized. There is no established industry standard that enables a service provider to provide a unitary process that allows the author of an artifact to provide trust at the source of the artifact all the way to the deployment or application of the artifact without having to consider different signing standards by artifact or target environment type. The Cloud Native Computing Foundation (CNCF) Notary project aims to solve a part of this problem by providing the signing and validation tools for how an object is signed and how the object is verified, and provides a standard that works across Open Container Initiative (OCI) artifacts. The CNCF Notary project mainly addresses the issue with existing notary service functionality in container registries which are specific to Docker container image trust, but does not extend or grant trust to a Helm package or chart, thus making it impossible to drive content trust across an entire Helm release deployment.

The present disclosure builds on the capabilities of OCI artifacts to be signed and verified. The disclosure provides a way to further grant trust to VM images, for example. The disclosure provides a single trust chain for all types of OCI artifacts that a service provider can store, manage, and enable users to access.

Another shortcoming in existing solutions is the lack of PKI for establishing the source of trust at the origin of the artifact and allowing that trust to be forwarded through public key distribution and management (e.g., key revocation, key rotation). The CNCF Notary project does not provide a PKI. Cloud platforms cannot entirely rely on external PKIs without their own trust boundaries. The present disclosure addresses this shortcoming by combining the merits of both. In an embodiment, established PKI service providers act as recognized and trustworthy CAs (e.g., IdenTrust, DigiCert, GlobalSign, GoDaddy, etc.) to manage the origin trust at the source by outsourcing verification of identity and issuance of the signing certificate to a CA that the service provider trusts. This eliminates the need for the service provider to act as a CA with third parties. Many third parties who act as publishers with a given service provider will likely have an existing relationship with a CA, which provides an efficient way to be integrated into an artifact trust infrastructure at the service provider. Third party publishers will thus not have to adopt proprietary key management into their supply chain and adopt continuous integration/continuous delivery (CI/CD) systems other than what they already have.

In another aspect of the present disclosure, the CA-based trusted artifacts are re-signed based on a distribution certificate that the service provider generates and manages. This is abstracted from publishers and orchestrators and allows the service provider to provide targeted signature trust validation for a range of different artifact types and target environments, abstracting the complexity to support ecosystem fragmentation from both the publishers and orchestrators. In the disclosed embodiments, artifact trust is a generic trait of any artifact in the cloud environment regardless of its type and target environment.

The present disclosure provides various techniques and functions that allow for ensuring artifact integrity, or the assurance that a digital artifact has remained unchanged and uncorrupted throughout its lifecycle. Some embodiments use digital signatures to ensure artifact integrity. Digital signatures use asymmetric cryptography to bind the integrity of an artifact to the identity of the signer. By signing an artifact with a private key, the recipient can verify the signature using the corresponding public key and ensure the artifact's integrity. Artifact authenticity refers to the quality of being genuine, trustworthy, and originating from a reliable source. Artifact authenticity ensures that an artifact is what it claims to be and has not been tampered with or modified by unauthorized entities. As used herein, an artifact can be artifact any reusable object that can be received by publishers and accessed/used by users, such as a container image, Helm package, Helm chart, configuration schema, templates, or virtual machine images.

In an embodiment, artifact authenticity can be determined using existing internet-based trust mechanisms, such as those provided by various CAs. A CA will issue digital certificates that bind the identity of an entity to a public key. For example, the identity is defined as the subject name in an X509 certificate. These certificates can be used to verify the authenticity of artifacts signed by the entity. Publishers can sign their artifacts using their private key and embed their certificates from a CA into the signature. The cloud service provider can ensure artifact authenticity by validating whether the certificates are issued from a trusted CA.

To distribute the trusted root CA certificate, the certificate can be made available to the cloud service provider's systems and managed locations that need to trust the certificates issued by that CA. Various embodiments may incorporate one or more of the following methods for distributing the trusted root CA certificate:

Operating system trust store: Many operating systems have a trust store where trusted root CA certificates are stored. Administrators can add or remove trusted CA certificates from this store. By adding the root CA certificate to the trust store, applications and services on the cloud service provider's systems will recognize and trust certificates issued by that CA.

PKI (Public Key Infrastructure): Kubernetes does not install trusted root CA certificates. In an embodiment, the cloud service provider places the trusted certificate into the Kubernetes cluster trust store. In some embodiments, open source tooling (e.g., Cert-Manager) can be used.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

With reference to FIG. 1, a service provider 100 receives signed artifacts 102 from network publishers 101. The signed artifacts 102 are signed with private key 103. The service provider 100 provides interfaces at a network function (NF) service 116 to operators 105 deploying the artifacts 102 into a customer location 140. To ensure end to end service trust, the service provider guarantees two types of supply chain trust. A service manager 110 provides a publisher service 112 that performs a trust check 130 and forwards/stores in container registries 120. The NF service 116 can also provide access to artifacts at a customer location 140 which may run a platform 142 that performs a trust check 135 using the root CA certificate 114.

More generally, code sign trust refers to the service provider 100 receiving artifacts 102 that are generated from the publishers' source code. Publishers 101 are responsible for signing their artifacts 102 with a signature after the artifacts 102 are generated, and the service provider 100 validates (trust check) 130 the signatures of the onboard artifacts in the artifact store. Thus all artifacts onboarded in the artifact store are associated with a validated signature, which can be verified by the service provider to ensure authenticity of the artifacts.

Distribution trust refers to the integrity of artifacts deployed by the service provider 100. A deployment engine, which in this example is implemented as publisher service 112 that deploys the artifacts, validates the signature of deployed artifacts to ensure the validity of deployed artifacts in the artifact store. The service provider 100 signs artifacts with a second signature to build distribution trust by the service provider. The second signature from the service provider eliminates the root trust certificate relied upon in the edge orchestration environment such as Kubernetes.

Publishers can rely upon different root trust certificates, and the management of a large number of root trust certificates requires significant effort. Additionally, it is desirable that only artifacts validated by the service provider are used. In an example, an attacker may request a valid certificate from a CA for a different entity and use it to sign artifacts. Those artifacts could still be validated by the trusted root certificate but would be rejected by the service provider. Adding a service provider signature can prevent this type of attack.

With reference to FIGS. 2A to 2F, in embodiments, the service provider maintains trusted CA root certificates within their platform. When implementing the disclosed embodiments, there can be two types of artifacts: verified trusted artifacts, and unverified and thus potentially untrusted artifacts. Operators should only use verified trusted artifacts in their network function deployment. In an embodiment, a property can be implemented that indicates that a network function deployment should only deploy verified trusted artifacts.

Figure 2A:
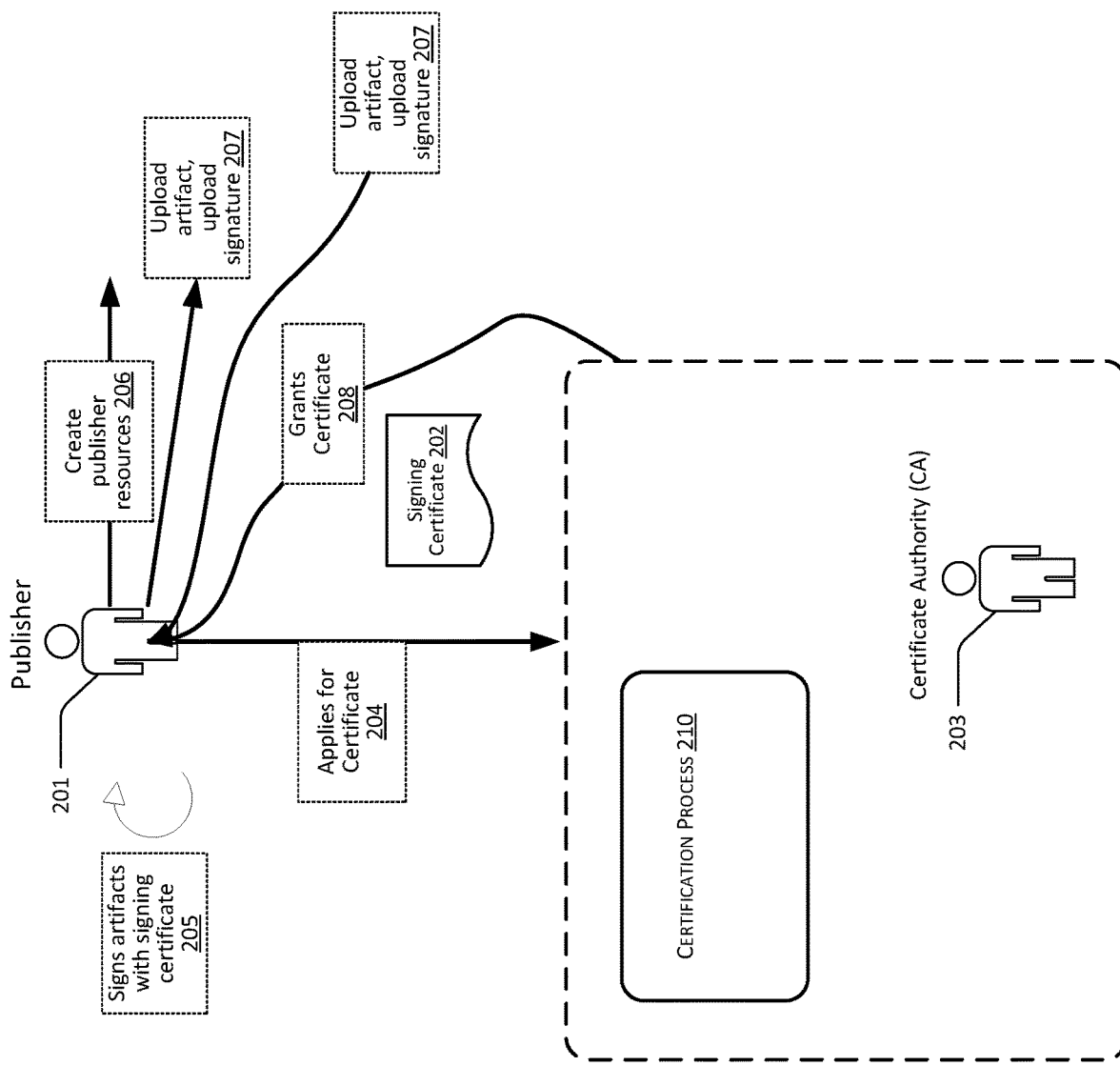
FIG. 2A is a diagram illustrating an example architecture in accordance with the present disclosure.
Figure 2B:
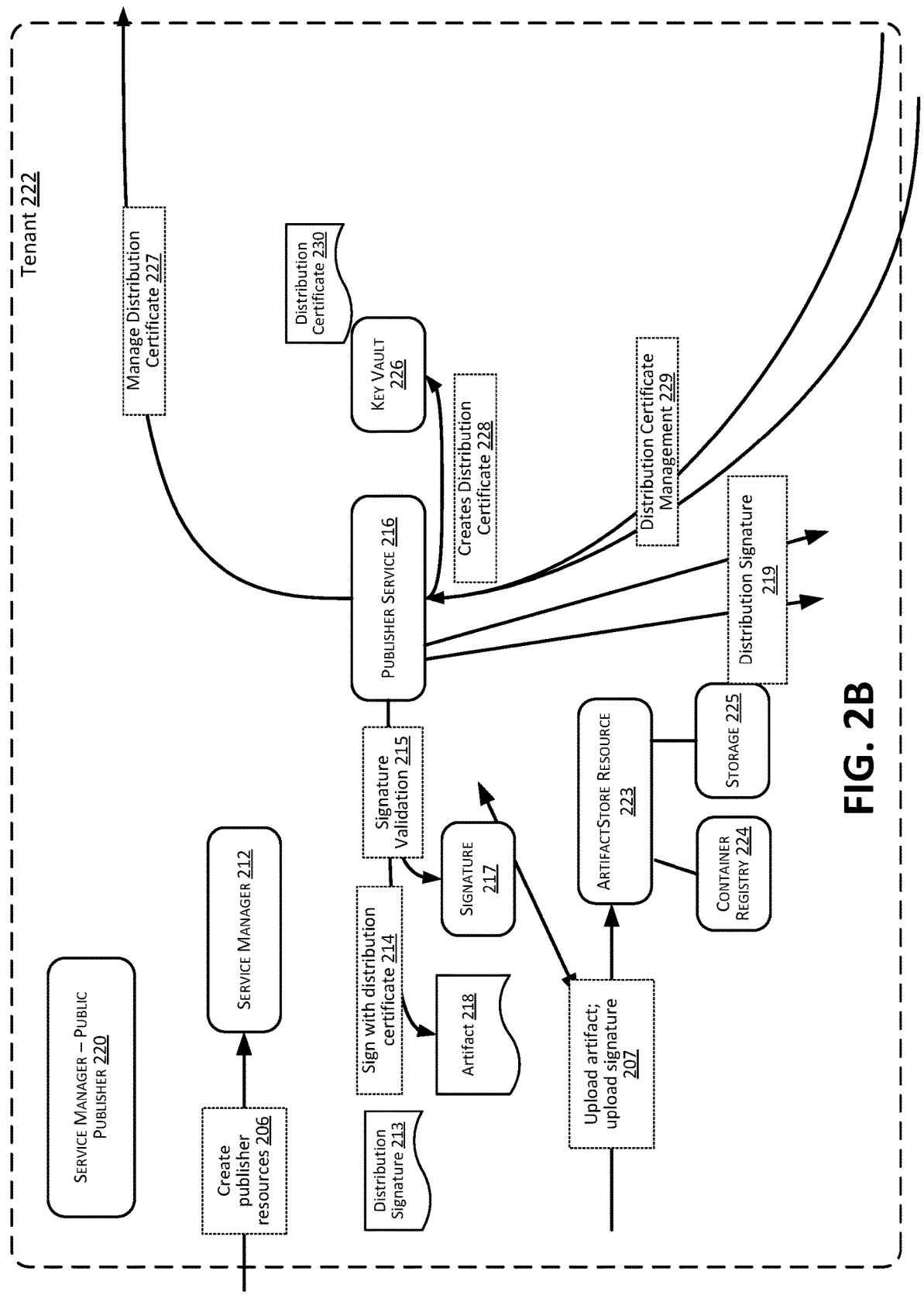
FIG. 2B is a diagram illustrating an example architecture in accordance with the present disclosure.

With reference to FIG. 2A and FIG. 2B, in embodiments, a publisher 201 applies for a certificate 204 from CA 203 via a certification process 210. CA 203 grants 208 a signing certificate 202 to publisher 201. Publisher 201 signs artifacts 205 with the signing certificate 202. The publisher 201 creates publisher resources 206, which can be at a service manager 212 at the service provider. The publisher 201 can upload 207 the artifacts and signature to artifact store as an artifact store resource 223. Artifact store resource 223 has container registry 224 and storage 225.

With reference to FIG. 2B, in embodiments, at tenant 222 which can be a service manager of public publisher 220, publisher service 216 performs signature validation 215 and creates a distribution certificate 230. Publisher service 216 signs 214 the artifact with distribution signature 213. Publisher service 216 creates distribution certificate 228 and provisions the distribution certificate 228 to a service key vault 226. Publisher service 216 manages the distribution certificate 227, 229 and provides the distribution signature 219.

Figure 2C:
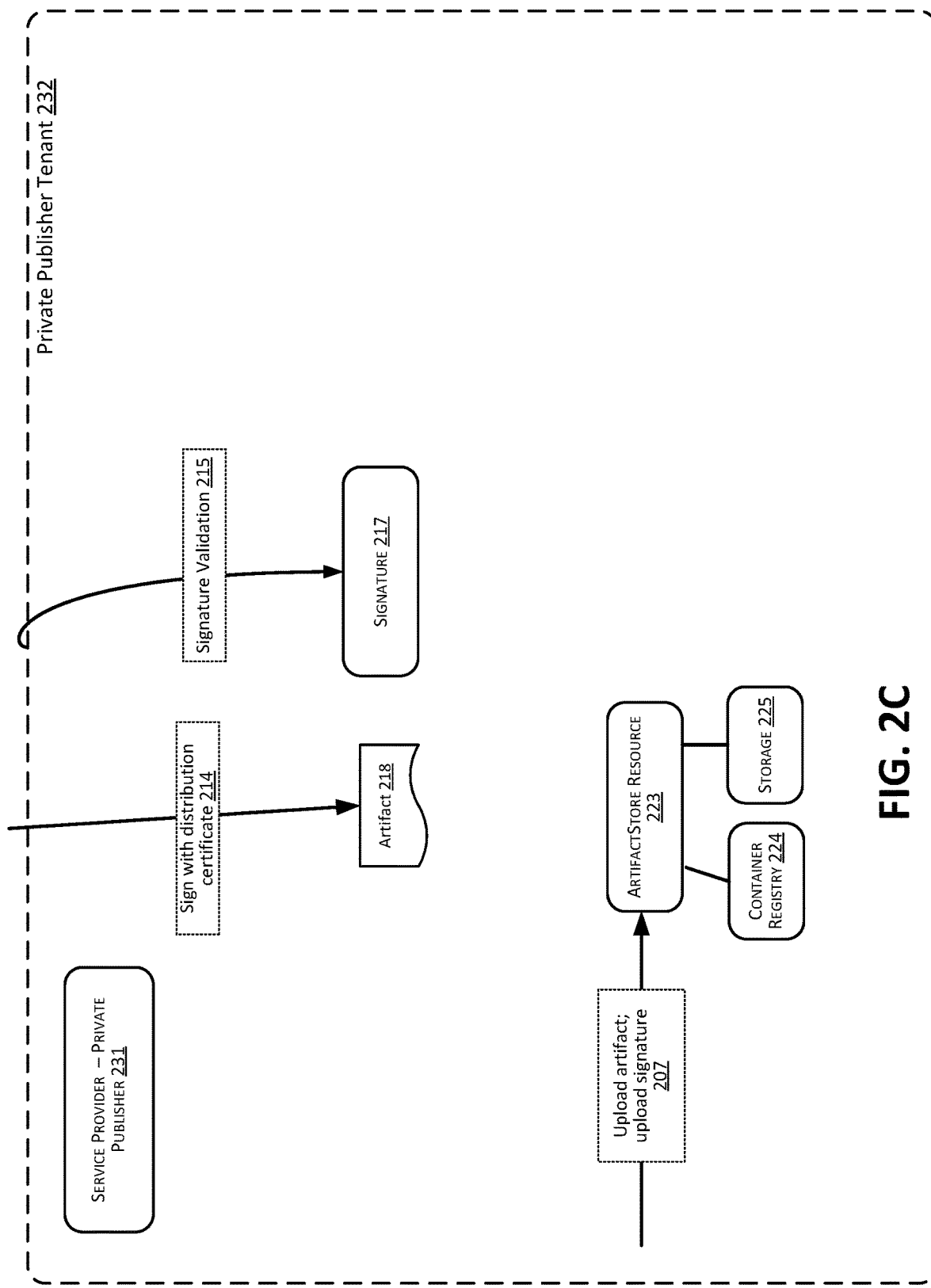
FIG. 2C is a diagram illustrating an example architecture in accordance with the present disclosure.

With reference to FIG. 2C, in embodiments, publisher tenant 232 at private publisher 231 receives artifact 218 and signature 217. Artifact 218 is signed with distribution certificate 214, and signature 217 is validated 215. Artifact 218 and signature 217 are uploaded 207 as artifact store resource 223 which has container registry 224 and storage 225.

Figure 2D:
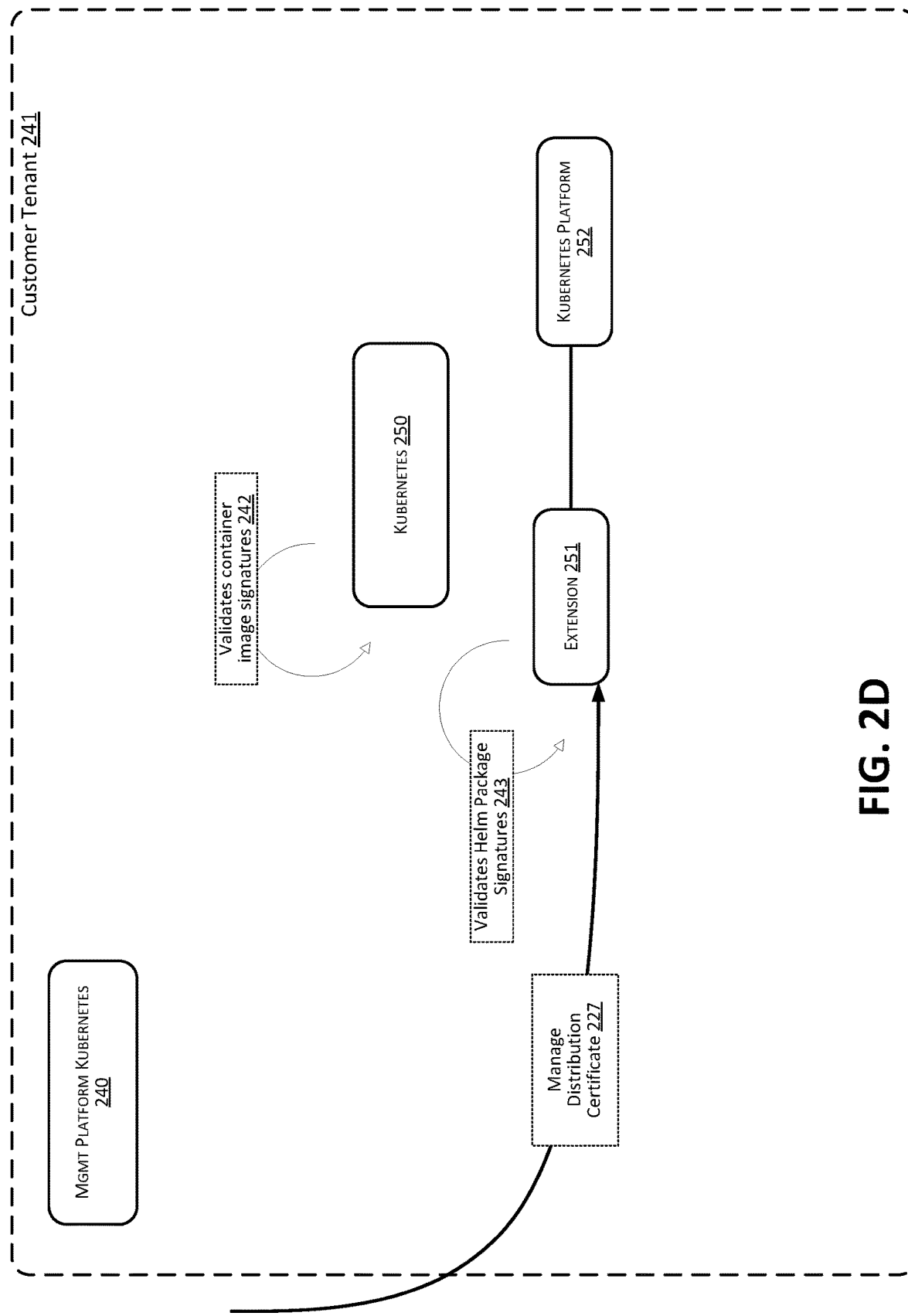
FIG. 2D is a diagram illustrating an example architecture in accordance with the present disclosure.

With reference to FIG. 2D, in embodiments, customer tenant 241 is enabled with Kubernetes 240, and validates Helm package signatures 243 using an extension 251 for Kubernetes platform 252, and validates container image signatures 242 via Kubernetes 250.

With reference to FIG. 2E, in embodiments, customer tenant 241 is enabled with with hybrid cloud 260, and validates VM image signatures 262 at the compute resources 263. The service provider performs distribution certificate management 261.

With reference to FIG. 2F, in embodiments, customer tenant 241 is enabled with via public cloud 270, and validates VM image signatures 262 at the compute resources 263. The service provider performs distribution certificate management 261.

Figure 3:
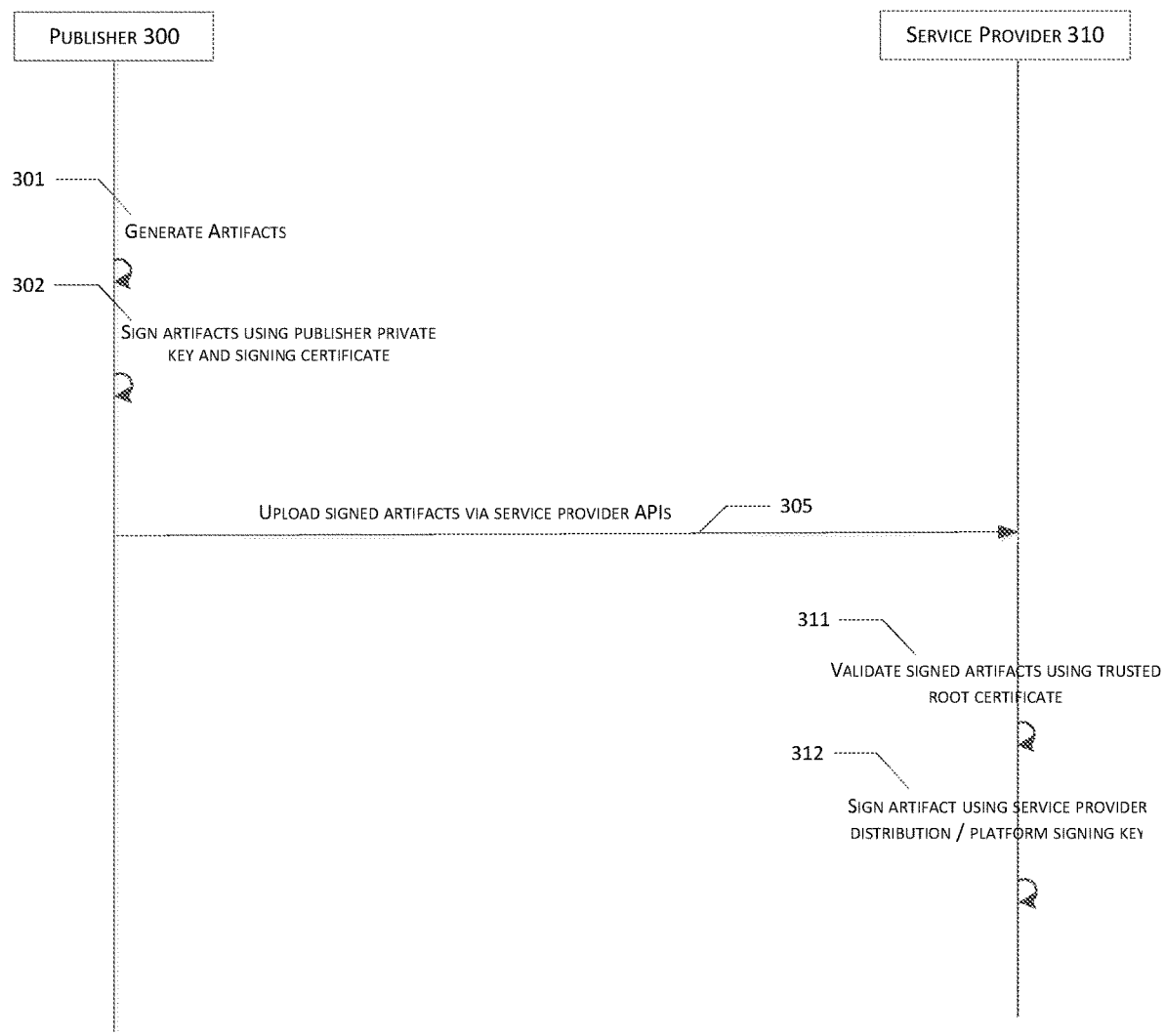
FIG. 3 is a diagram illustrating an example flow diagram in accordance with the present disclosure.

With further reference to FIG. 3, artifacts are generated 301 at publisher 300. Publisher 300 signs artifacts 302 using a publisher private key and signing certificate. Signed artifacts are uploaded via service provider APIs 305. The service provider 310 validates signed artifacts using a trusted root certificate 311, and signs artifacts 312 using a service provider distribution/platform signing key. The service provider performs an authenticity check by validating the signature signed by a trust identity defined in an artifact store object. The service provider signs 312 the artifacts using the service provider distribution/platform key.

Figure 4:
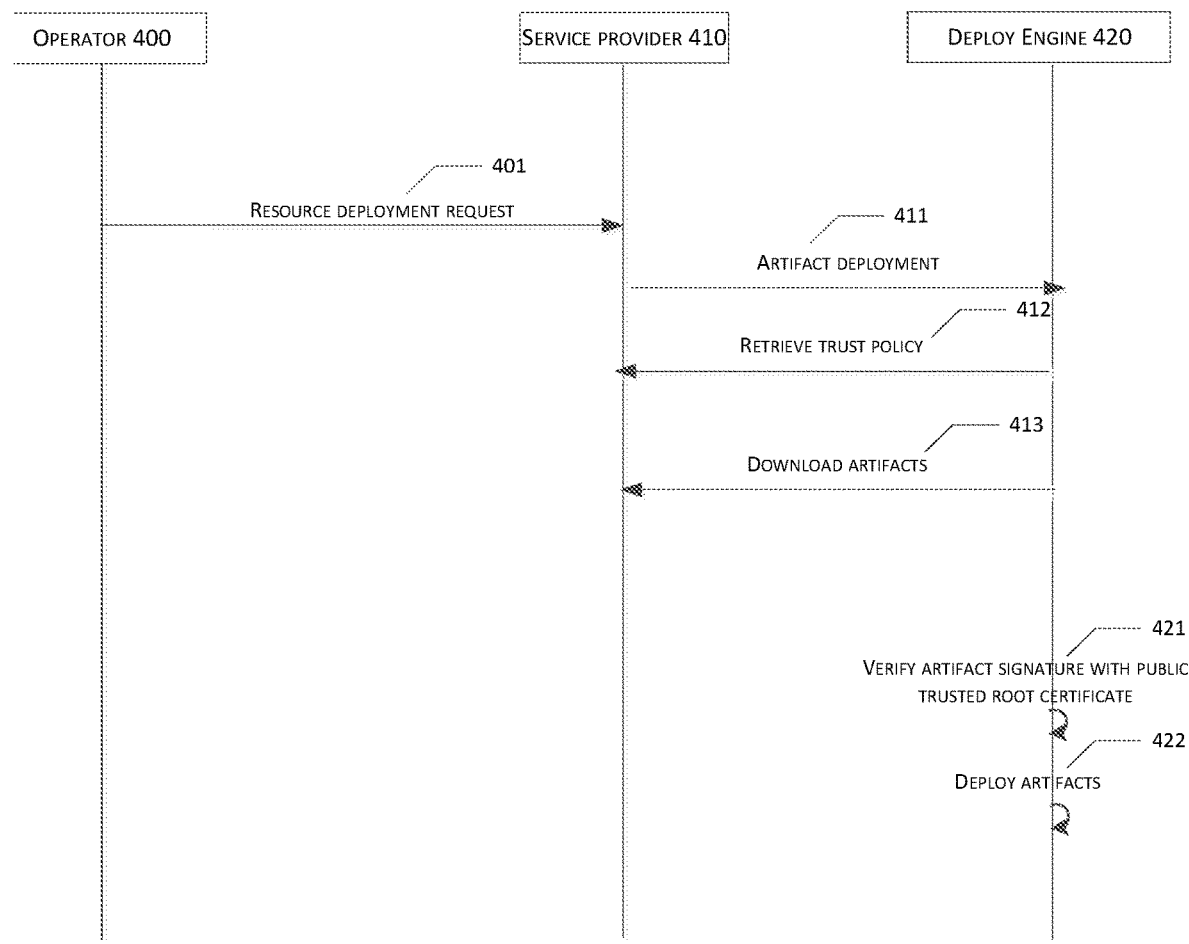
FIG. 4 is a diagram illustrating an example flow diagram in accordance with the present disclosure.

With further reference to FIG. 4, an operator 400 requests 401 deployment of a network function or service. The service provider 410 receives the request and schedules the deployment 411. The service provider can utilize a component that initiates the deployment. For example, the component can start a Helm release in a customer cluster. A trust policy is retrieved 412 from the service provider and artifacts are downloaded 413. The signature is validated 421 at deploy engine 420 by applying the trust policy, and using the key from the root certificate available in the cluster. If signature validation passes, the deployment is started 422.

Figure 5:
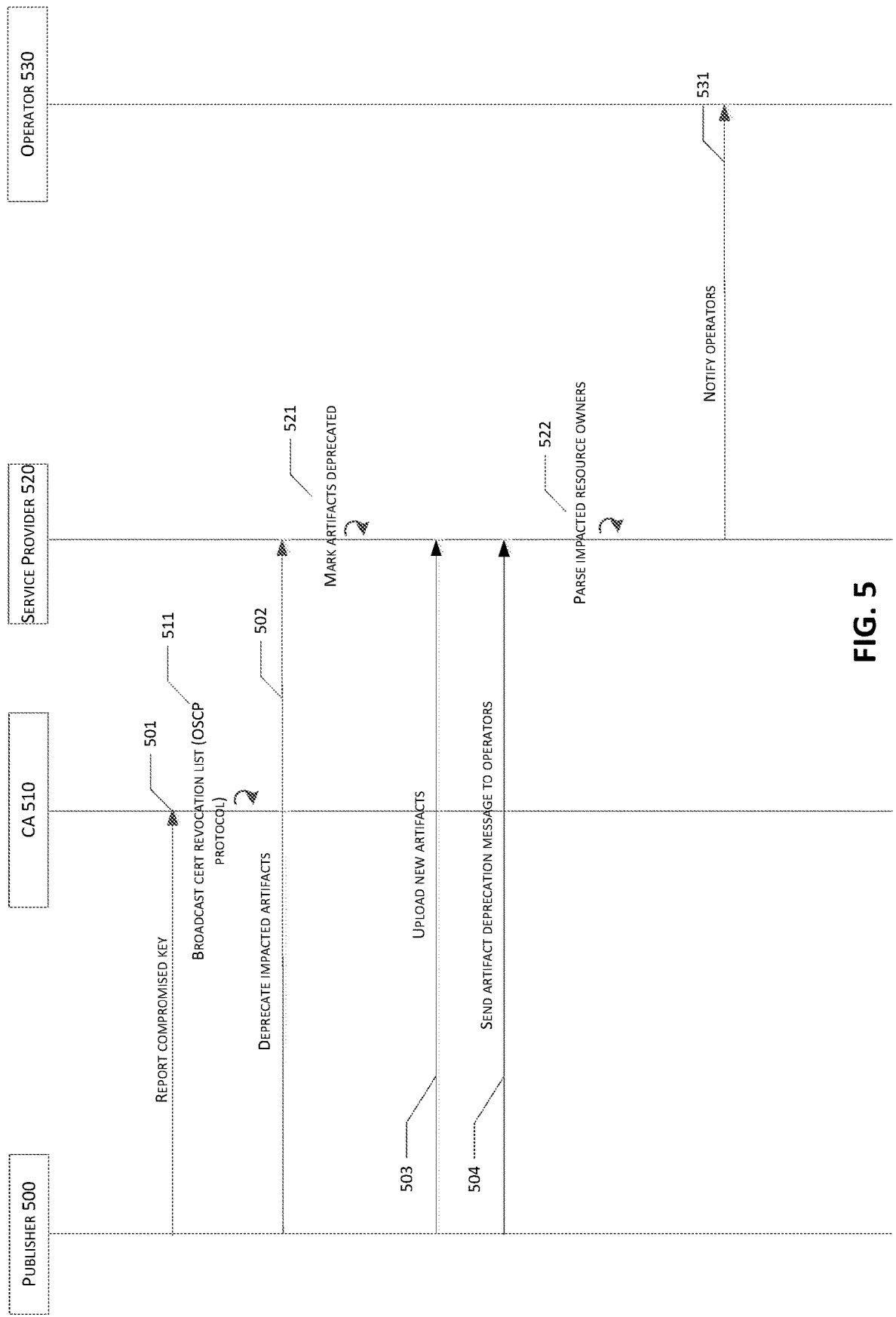
FIG. 5 is a diagram illustrating an example flow diagram in accordance with the present disclosure.

With reference to FIG. 5, illustrated is a process for key revocation/rotation using the Online Certificate Status Protocol (OCSP) protocol. In an embodiment, the publisher 500 reports a compromised key 501 to the CA 510. The CA 510 deprecates impacted artifacts 502 by adding the corresponding certificate into its certificate revocation list and distributes the list 511 via the OCSP protocol. The service provider 520 integrates the list with the CA to pull the certificate revocation list (CRL) or uses OCSP to obtain the compromised certificate information. The publisher 500 can deprecate artifacts 521 by invoking a service provider API or other means of communication to prevent future use of the artifacts. The service provider 520 parses out 522 impacted network functions and services and associated resources. Operators 530 can be notified 531 about impacted service and function resources.

In some embodiments, tools known in the art can be used to sign and verify artifact signatures, including Notation (Notary) and Cosign.

Typically, trusted root certificates should be installed by the operating system of the machine. However, this is not the case for Kubernetes clusters. By default, Kubernetes clusters do not install any trusted root certificates. In an embodiment, a trust root certificate is included as part of a build and released into the Kubernetes cluster. In some embodiments, the certificate is handled by a PKI managed by the service provider.

In one example implementation, the service provider can provision a Digi-cert to a service key vault. A leaf certificate can be provisioned in each region as a distributed signing key. A service can be implemented for signature verification in Kubernetes clusters and to program a trust policy in a Kubernetes cluster. A trust policy ensures that all pods in the default namespace have a signature which can be verified with a trusted root certificate.

Figure 6:
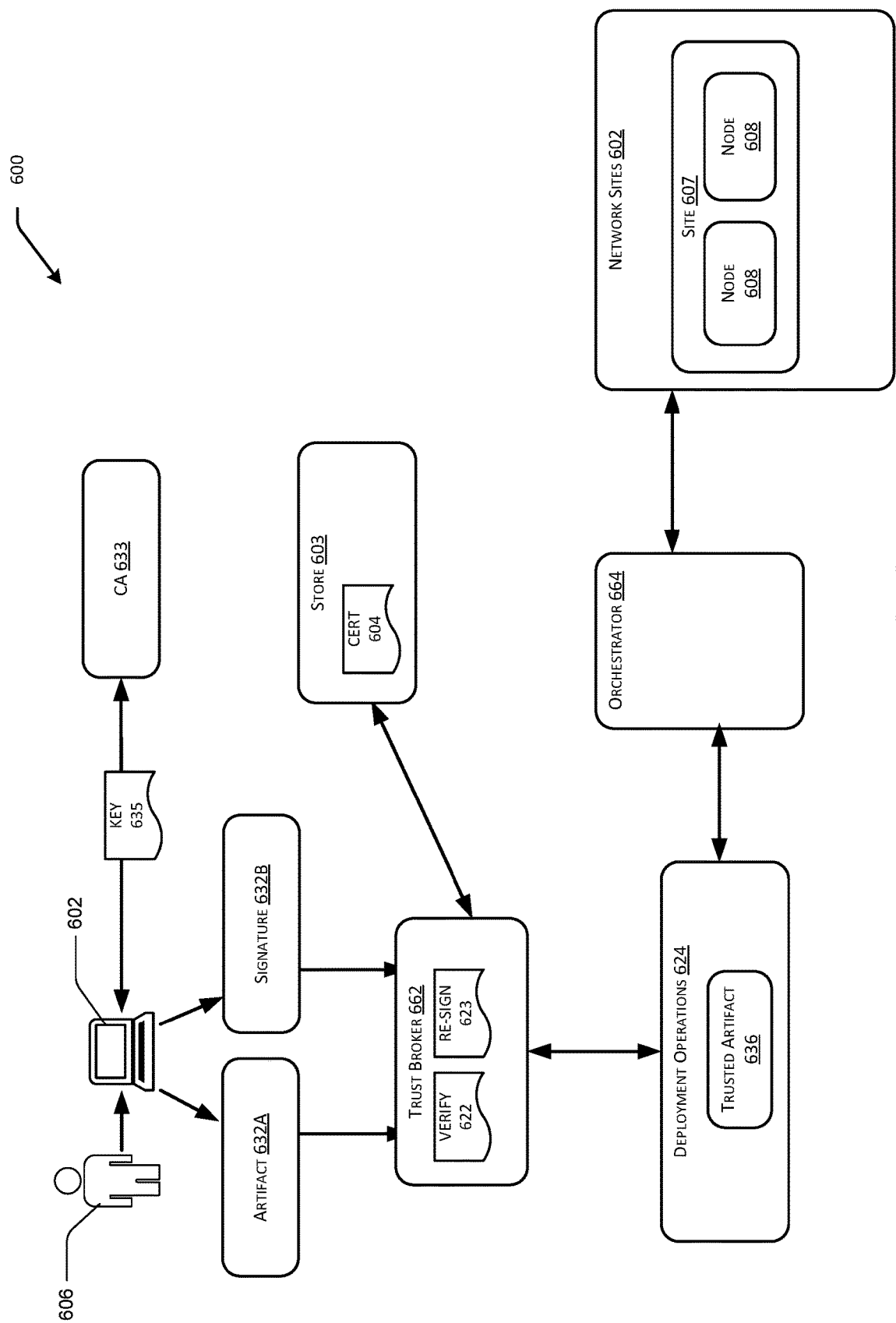
FIG. 6 is a diagram illustrating an example flow diagram in accordance with the present disclosure.

With reference to FIG. 6, illustrated is an example implementation in accordance with the disclosure. A computing service provider for a computing network 600 receives from a publisher 606 an artifact 632A that is usable for deployments 622 in the computing network 600. The computing service provider receives, from the publisher 606, a signature 632B for the artifact 632A. The signature 632B is based on a signing key 635 obtained from a certificate authority 633. The service provider verifies 622 the signature 632B at trust broker 662. In response to verifying the signature, the service provider re-signs 623 the artifact 632A with a certificate 604 generated and managed by the service provider and can be saved at store 603. The re-signed (trusted) artifact 636 is used as a source of trust for the artifact 632A for distribution and lifecycle of the artifact 632A for deployments 624 in the computing network. For example, an orchestrator 664 can use the re-signed artifact 636 for deployments 624 in a site 607 comprising nodes 608 at network sites 602.

The present disclosure may be implemented in a mobile edge computing (MEC) environment implemented in conjunction with a 4G, 5G, or other cellular network. MEC is a type of edge computing that uses cellular networks and 5G and enables a data center to extend cloud services to local deployments using a distributed architecture that provide federated options for local and remote data and control management. MEC architectures may be implemented at cellular base stations or other edge nodes and enable operators to host content closer to the edge of the network, delivering high-bandwidth, low-latency applications to end users. For example, the cloud provider's footprint may be co-located at a carrier site (e.g., carrier data center), allowing for the edge infrastructure and applications to run closer to the end user via the 5G network.

Figure 7:
FIG. 7 is a diagram illustrating an example data center in accordance with the present disclosure.

FIG. 7 illustrates an example computing environment in which the embodiments described herein may be implemented. FIG. 7 illustrates a service provider 700 that is configured to provide computing resources to users at user site 770. The user site 770 may have user computers that may access services provided by service provider 700 via a network 730. The computing resources provided by the service provider 700 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 700 may have various computing resources via provided networks 720 including servers, routers, and other devices that may provide remotely accessible computing and network resources using, for example, virtual machines. Other resources that may be provided include data storage resources. Service provider 700 may also execute functions that manage and control allocation of network resources, such as a network manager 710.

Network 730 may, for example, be a publicly accessible network of linked networks and may be operated by various entities, such as the Internet. In other embodiments, network 730 may be a private network, such as a dedicated network that is wholly or partially inaccessible to the public. Network 730 may provide access to computers and other devices at the user site 770.

FIG. 7 illustrates that an edge site 750 may be implemented to extend the physical reach of service provider 700 to provide localized computing resources to users at user site 770 using provided networks 760. The computing resources provided by the edge site 750 may include some or all of the various types of resources provided by service provider 700. The resources at edge site 750 may be under the control of service provider 700.

Figure 8:
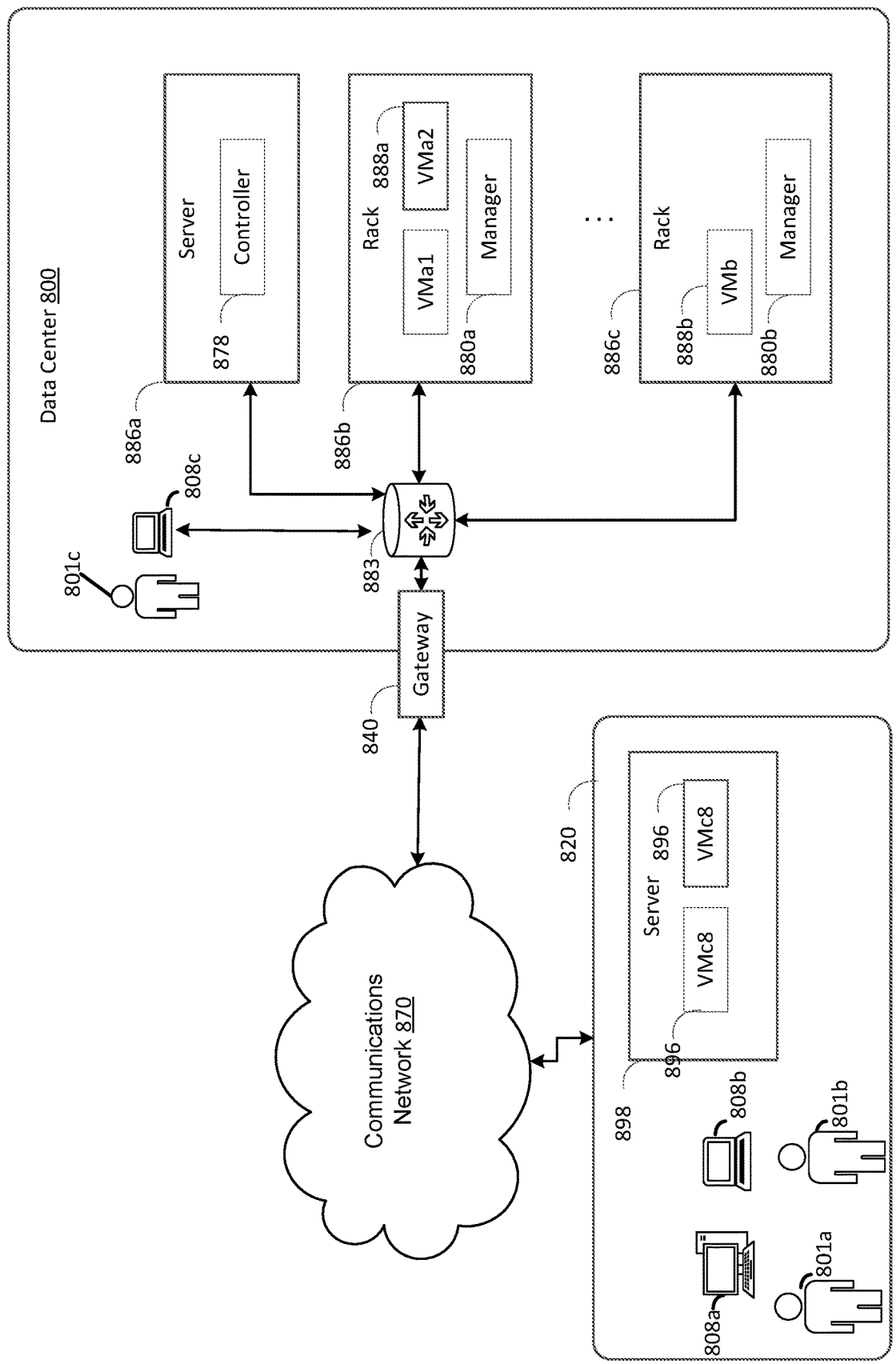
FIG. 8 is a diagram illustrating an example data center for managing resources in accordance with the present disclosure.

FIG. 8 illustrates an example computing environment in which the embodiments described herein may be implemented. FIG. 8 illustrates a data center 800 that is configured to provide computing resources to users 801a, 801b, or 801c (which may be referred herein singularly as "a user 801" or in the plural as "the users 801") via user computers 808a, 808b, and 808c (which may be referred herein singularly as "a computer 808" or in the plural as "the computers 808") via a communications network 870. The computing resources provided by the data center 800 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 800 may include servers 886a, 886b, and 886c (which may be referred to herein singularly as "a server 886" or in the plural as "the servers 886") that may be standalone or installed in server racks, and provide computing resources available as virtual machines 888a and 888b (which may be referred to herein singularly as "a virtual machine 888" or in the plural as "the virtual machines 888"). The virtual machines 888 may be configured to execute applications such as Web servers, application servers, media servers, database servers, and the like. Other resources that may be provided include data storage resources (not shown on FIG. 8) and may include file storage devices, block storage devices, and the like. Servers 886 may also execute functions that manage and control allocation of resources in the data center, such as a controller 878. Controller 878 may be a fabric controller or another type of program configured to manage the allocation of virtual machines on servers 886.

Referring to FIG. 8, communications network 870 may, for example, be a publicly accessible network of linked networks and may be operated by various entities, such as the Internet. In other embodiments, communications network 870 may be a private network, such as a corporate network that is wholly or partially inaccessible to the public.

Communications network 870 may provide access to computers 808. Computers 808 may be computers utilized by users 801. Computer 808a, 808b or 808c may be a server, a desktop or laptop personal computer, a tablet computer, a smartphone, a set-top box, or any other computing device capable of accessing data center 800. User computer 808a or 808b may connect directly to the Internet (e.g., via a cable modem). User computer 808c may be internal to the data center 800 and may connect directly to the resources in the data center 800 via internal networks. Although only three user computers 808a, 808b, and 808c are depicted, it should be appreciated that there may be multiple user computers.

Computers 808 may also be utilized to configure aspects of the computing resources provided by data center 800. For example, data center 800 may provide a Web interface through which aspects of its operation may be configured through the use of a Web browser application program executing on user computer 808. Alternatively, a stand-alone application program executing on user computer 808 may be used to access an application programming interface (API) exposed by data center 800 for performing the configuration operations.

Servers 886 may be configured to provide the computing resources described above. One or more of the servers 886 may be configured to execute a manager 880a or 880b (which may be referred herein singularly as "a manager 880" or in the plural as "the managers 880") configured to execute the virtual machines. The managers 880 may be a virtual machine monitor (VMM), fabric controller, or another type of program configured to enable the execution of virtual machines 888 on servers 886, for example.

It should be appreciated that although the embodiments disclosed above are discussed in the context of virtual machines, other types of implementations can be utilized with the concepts and technologies disclosed herein.

In the example data center 800 shown in FIG. 8, a network device 883 may be utilized to interconnect the servers 886a and 886b. Network device 883 may comprise one or more switches, routers, or other network devices. Network device 883 may also be connected to gateway 840, which is connected to communications network 870. Network device 883 may facilitate communications within networks in data center 800, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 800 described in FIG. 8 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

FIG. 8 further illustrates an edge site 820 that is geographically proximate to a facility local to users 801. In one embodiment, one or more servers 898 may be installed at the edge site 820. In an embodiment, servers 898 instantiate and run virtual machines 896.

In some embodiments, users 801 may specify configuration information for a virtual network to be provided for the user, with the configuration information optionally including a variety of types of information such as network addresses to be assigned to computing endpoints of the provided computer network, network topology information for the provided computer network, network access constraints for the provided computer network. The network addresses may include, for example, one or more ranges of network addresses, which may correspond to a subset of virtual or private network addresses used for the user's private computer network. The network topology information may indicate, for example, subsets of the computing endpoints to be grouped together, such as by specifying networking devices to be part of the provided computer network, or by otherwise indicating subnets of the provided computer network or other groupings of the provided computer network. The network access constraint information may indicate, for example, for each of the provided computer network's computing endpoints, which other computing endpoints may intercommunicate with the computing node endpoint, or the types of communications allowed to/from the computing endpoints.

Figure 9:
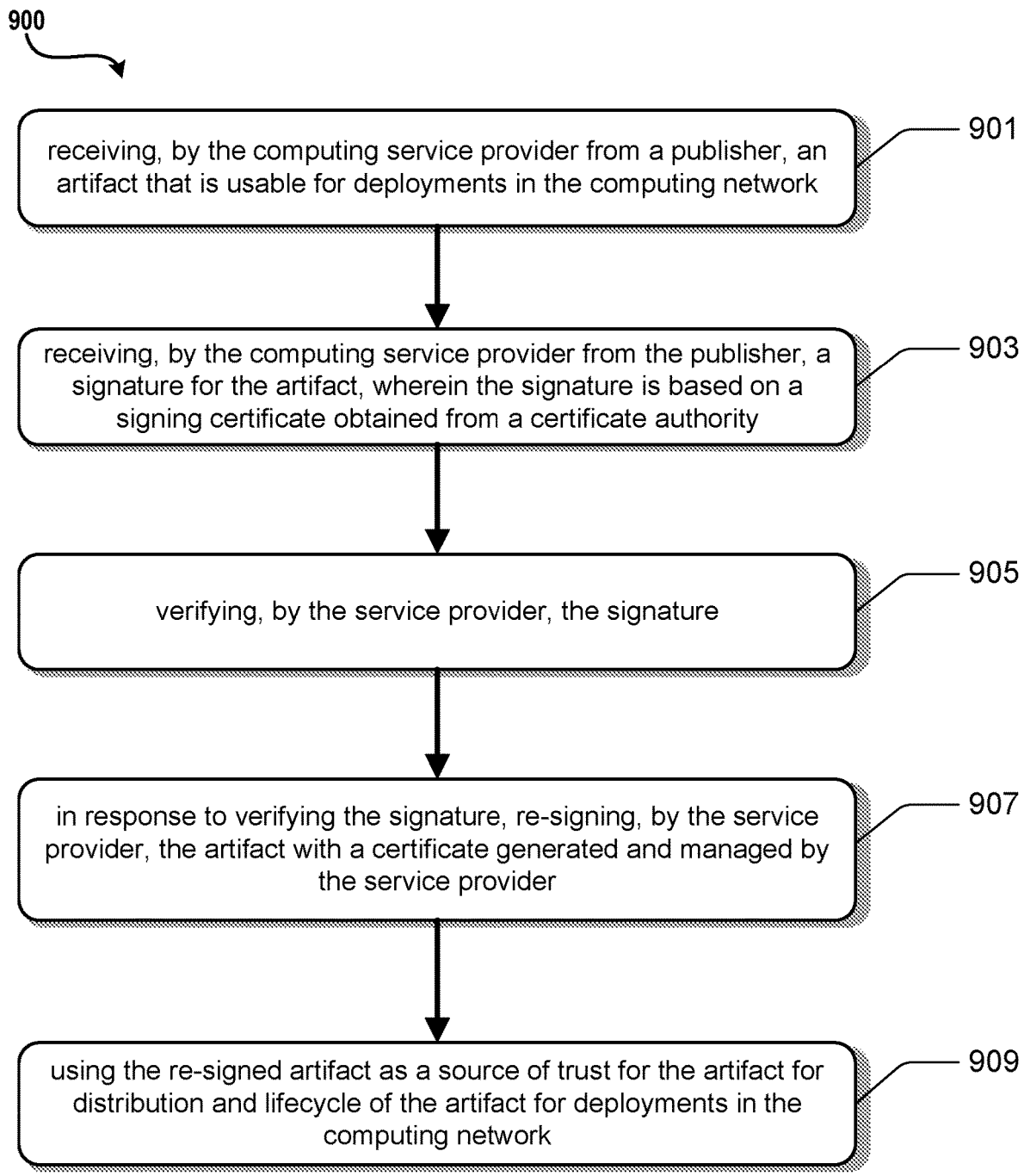
FIG. 9 is a flowchart depicting an example procedure in accordance with the present disclosure.

Turning now to FIG. 9, illustrated is an example operational procedure for managing trusted content in a computing network operated by a computing service provider in accordance with the present disclosure. Such an operational procedure can be provided by one or more components illustrated in FIGS. 1 through 6. The operational procedure may be implemented in a computing environment comprising a computing service provider and an edge computing network. The edge computing network may comprise computing and storage devices configured to extend computing resources of the computing service provider to remote users of the computing service provider.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

It should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Thus, although the routine 900 is described as running on a system, it can be appreciated that the routine 900 and other operations described herein can be executed on an individual computing device or several devices.

Referring to FIG. 9, operation 901 illustrates receiving, by the computing service provider from a publisher, an artifact that is usable for deployments in the computing network.

Operation 903 illustrates receiving, by the computing service provider from the publisher, a signature for the artifact. In an embodiment, the signature is based on a signing key obtained from a certificate authority.

Operation 905 illustrates verifying, by the service provider, the signature.

Operation 907 illustrates in response to verifying the signature, re-signing, by the service provider, the artifact with a certificate generated and managed by the service provider.

Operation 909 illustrates using the re-signed artifact as a source of trust for the artifact for distribution and lifecycle of the artifact for deployments in the computing network.

The various aspects of the disclosure have been described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc.

A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Figure 10:
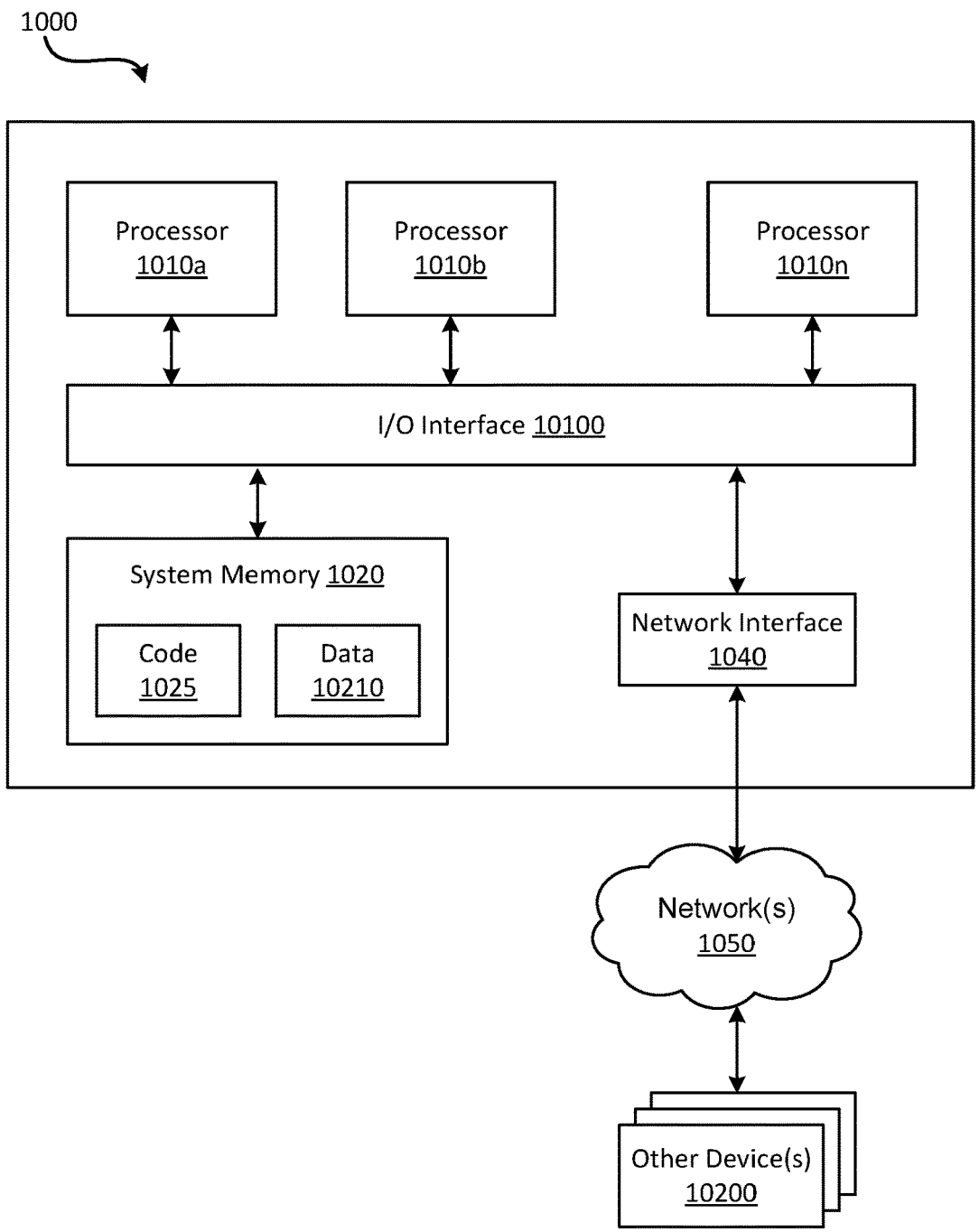
FIG. 10 is an example computing system in accordance with the present disclosure.

FIG. 10 illustrates a general-purpose computing device 1000. In the illustrated embodiment, computing device 1000 includes one or more processors 1010*a*, 1010*b*, and/or 1010*n* (which may be referred herein singularly as "a processor 1010" or in the plural as "the processors 1010") coupled to a system memory 1020 via an input/output (I/O) interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x1010, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 1020 as code 1025 and data 10210.

In one embodiment, I/O interface 1030 may be configured to coordinate I/O traffic between the processor 1010, system memory 1020, and any peripheral devices in the device, including network interface 1040 or other peripheral interfaces. In some embodiments, I/O interface 1030 may perform any necessary protocol, timing, or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 10200 attached to a network or network(s) 1050, such as other computer systems or devices as illustrated in FIGS. 1 through 9, for example. In various embodiments, network interface 1040 may support communication via any suitable wired or wireless general data networks, such as types of Ethernet networks, for example. Additionally, network interface 1040 may support communication via telecommunications/telephony networks such as analog voice networks or digital fiber communications networks, via storage area networks such as Fibre Channel SANs or via any other suitable type of network and/or protocol.

In some embodiments, system memory 1020 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals such as electrical, electromagnetic or digital signals, conveyed via a communication medium such as a network and/or a wireless link, such as may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 10, may include other components that are not explicitly shown in FIG. 10, or may utilize an architecture completely different than that shown in FIG. 10.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for managing trusted content in a computing network operated by a computing service provider, the method comprising:

receiving, by the computing service provider from a publisher, an artifact that is usable for deployments in the computing network;

receiving, by the computing service provider from the publisher, a signature for the artifact, wherein the signature is based on a signing certificate obtained from a certificate authority;

verifying, by the computing service provider, the signature;

in response to verifying the signature, re-signing, by the computing service provider, the artifact with a certificate generated and managed by the computing service provider; and using the re-signed artifact as a source of trust for the artifact for distribution and lifecycle of the artifact for the deployments in the computing network.

Clause 2: The method of clause 1, wherein the method is agnostic to a type of the artifact.

Clause 3: The method of any of clauses 1-2, wherein the artifact is one of a container image, Helm package, Helm chart, configuration schema, templates, or virtual machine images.

Clause 4: The method of any of clauses 1-3, further comprising providing immutability and versioning for the artifact.

Clause 5: The method of any of clauses 1-4, further comprising revoking the artifact as a trusted artifact.

Clause 6: The method of any of clauses 1-5, further comprising storing a plurality of re-signed artifacts in an artifact store.

Clause 7: The method of any of clauses 1-6, wherein the verifying of the signature is based on a trust policy.

Clause 8: A system comprising:

a memory storing thereon instructions that when executed by a processing system of the computing device, cause the computing device to perform operations comprising:

receiving, from a publisher, an artifact that is usable for deployments in a computing network;

receiving, from the publisher, a signature for the artifact, wherein the signature is based on a signing certificate obtained from a certificate authority;

verifying the signature;

in response to verifying the signature, re-signing the artifact with a certificate generated and managed by a service provider; and using the re-signed artifact as a source of trust for the artifact for distribution and lifecycle of the artifact for the deployments in the computing network.

Clause 9: The edge computing network of clause 8, wherein the operations are agnostic to a type of the artifact.

Clause 10: The edge computing network of any of clauses 8 and 9, wherein the artifact is one of a container image, Helm package, Helm chart, configuration schema, templates, or virtual machine images.

Clause 11: The edge computing network of any of clauses 8-10, further comprising instructions that when executed by a processing system of the computing device, cause the computing device to perform operations comprising providing immutability and versioning for the artifact.

Clause 12: The edge computing network of any of clauses 8-11, further comprising instructions that when executed by a processing system of the computing device, cause the computing device to perform operations comprising revoking the artifact as a trusted artifact.

Clause 13: The edge computing network of any of clauses 8-12, further comprising instructions that when executed by a processing system of the computing device, cause the computing device to perform operations comprising storing a plurality of re-signed artifacts in an artifact store.

Clause 14: The edge computing network of any of clauses 8-13, wherein the verifying of the signature is based on a trust policy.

Clause 15: A computer-readable storage medium having computer-executable instructions stored thereupon which, when executed by one or more processors of a system, cause the system to perform operations comprising:
  receiving, from a publisher, an artifact that is usable for deployments in a computing network;
  receiving, from the publisher, a signature for the artifact, wherein the signature is based on a signing certificate obtained from a certificate authority;
  verifying the signature;
  in response to verifying the signature, re-signing the artifact with a certificate generated and managed by a service provider; and
  using the re-signed artifact as a source of trust for the artifact for distribution and lifecycle of the artifact for the deployments in the computing network.

Clause 16: The computer-readable storage medium of clause 15, wherein the operations are agnostic to a type of the artifact.

Clause 17: The computer-readable storage medium of any of clauses 15 and 16, wherein the artifact is one of a container image, Helm package, Helm chart, configuration schema, templates, or virtual machine images.

Clause 18: The computer-readable storage medium of any of the clauses 15-17, further comprising computer-executable instructions stored thereupon which, when executed by one or more processors of a system, cause the system to perform operations comprising providing immutability and versioning for the artifact.

Clause 19: The computer-readable storage medium of any of the clauses 15-18, further comprising computer-executable instructions stored thereupon which, when executed by one or more processors of a system, cause the system to perform operations comprising revoking the artifact as a trusted artifact.

Clause 20: The computer-readable storage medium of any of the clauses 15-19, further comprising computer-executable instructions stored thereupon which, when executed by one or more processors of a system, cause the system to perform operations comprising storing a plurality of re-signed artifacts in an artifact store.

The invention claimed is:

1. A method for managing trusted content in a computing network operated by a computing service provider, the method comprising:
  receiving, by the computing service provider from a publisher, an artifact that is usable for deployments in the computing network;
  determining that the artifact is associated with a resource type for an artifact store implemented at the computing service provider, wherein:
    the artifact store holds artifacts under management of the computing service provider;
    the service provider manages underlying registry and storage mechanisms for the artifacts; and
    the artifact store requires publishers of artifacts to provide a valid signature for each artifact that the publishers declare and enter into the artifact store;
  receiving, by the computing service provider from the publisher, a signature for the artifact, wherein the signature is based on a signing certificate obtained from a certificate authority;
  verifying, by the computing service provider, the signature;
  in response to verifying the signature, re-signing, by the computing service provider, the artifact with a certificate generated and managed by the computing service provider; and
  using the re-signed artifact as a source of trust for the artifact for distribution and lifecycle of the artifact for the deployments in the computing network.

2. The method of claim 1, wherein the method is agnostic to a type of the artifact.

3. The method of claim 2, wherein the artifact is one of a container image, Helm package, Helm chart, configuration schema, templates, or virtual machine images.

4. The method of claim 1, further comprising providing immutability and versioning for the artifact.

5. The method of claim 1, further comprising revoking the artifact as a trusted artifact.

6. The method of claim 1, further comprising storing a plurality of re-signed artifacts in an artifact store.

7. The method of claim 1, wherein the verifying of the signature is based on a trust policy.

8. A computing device comprising:
  a memory storing thereon instructions that when executed by a processing system of the computing device, cause the computing device to perform operations comprising:
  receiving, from a publisher, an artifact that is usable for deployments in a computing network;
  determining that the artifact is associated with a resource type for an artifact store implemented at a computing service provider, wherein:
    the artifact store holds artifacts under management of the computing service provider;
    the service provider manages underlying registry and storage mechanisms for the artifacts; and
    the artifact store requires publishers of artifacts to provide a valid signature for each artifact that the publishers declare and enter into the artifact store;
  receiving, from the publisher, a signature for the artifact, wherein the signature is based on a signing certificate obtained from a certificate authority;
  verifying the signature;
  in response to verifying the signature, re-signing the artifact with a certificate generated and managed by a service provider; and
  using the re-signed artifact as a source of trust for the artifact for distribution and lifecycle of the artifact for the deployments in the computing network.

9. The computing device of claim 8, wherein the operations are agnostic to a type of the artifact.

10. The computing device of claim 9, wherein the artifact is one of a container image, Helm package, Helm chart, configuration schema, templates, or virtual machine images.

11. The computing device of claim 8, further comprising instructions that when executed by a processing system of the computing device, cause the computing device to perform operations comprising providing immutability and versioning for the artifact.

12. The computing device of claim 8, further comprising instructions that when executed by a processing system of the computing device, cause the computing device to perform operations comprising revoking the artifact as a trusted artifact.

13. The computing device of claim 8, further comprising instructions that when executed by a processing system of the computing device, cause the computing device to perform operations comprising storing a plurality of re-signed artifacts in an artifact store.

14. The computing device of claim 8, wherein the verifying of the signature is based on a trust policy.

15. A computer-readable storage medium having computer-executable instructions stored thereupon which, when executed by one or more processors of a system, cause the system to perform operations comprising:
- receiving, from a publisher, an artifact that is usable for deployments in a computing network;
- determining that the artifact is associated with a resource type for an artifact store implemented at a computing service provider, wherein:
  - the artifact store holds artifacts under management of the computing service provider;
  - the service provider manages underlying registry and storage mechanisms for the artifacts; and
  - the artifact store requires publishers of artifacts to provide a valid signature for each artifact that the publishers declare and enter into the artifact store;
- receiving, from the publisher, a signature for the artifact, wherein the signature is based on a signing certificate obtained from a certificate authority;
- verifying the signature;
- in response to verifying the signature, re-signing the artifact with a certificate generated and managed by a service provider; and
- using the re-signed artifact as a source of trust for the artifact for distribution and lifecycle of the artifact for the deployments in the computing network.

16. The computer-readable storage medium of claim 15, wherein the operations are agnostic to a type of the artifact.

17. The computer-readable storage medium of claim 16, wherein the artifact is one of a container image, Helm package, Helm chart, configuration schema, templates, or virtual machine images.

18. The computer-readable storage medium of claim 15, further comprising computer-executable instructions stored thereupon which, when executed by one or more processors of a system, cause the system to perform operations comprising providing immutability and versioning for the artifact.

19. The computer-readable storage medium of claim 15, further comprising computer-executable instructions stored thereupon which, when executed by one or more processors of a system, cause the system to perform operations comprising revoking the artifact as a trusted artifact.

20. The computer-readable storage medium of claim 15, further comprising computer-executable instructions stored thereupon which, when executed by one or more processors of a system, cause the system to perform operations comprising storing a plurality of re-signed artifacts in an artifact store.

* * * * *